United States Patent
Jaspan

(10) Patent No.: US 6,553,175 B2
(45) Date of Patent: Apr. 22, 2003

(54) VARIABLE OPTICAL ATTENUATOR

(75) Inventor: Martin Jaspan, Somerville, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 103 days.

(21) Appl. No.: 09/765,059

(22) Filed: Jan. 17, 2001

(65) Prior Publication Data

US 2001/0021302 A1 Sep. 13, 2001

(51) Int. Cl.⁷ .................................................. G02B 6/00
(52) U.S. Cl. ..................... 385/140; 359/577; 359/888; 359/578; 359/588; 359/589
(58) Field of Search .............................. 359/577, 587, 359/586, 588, 589, 578; 385/140

(56) References Cited

U.S. PATENT DOCUMENTS

| | | | |
|---|---|---|---|
| 4,591,231 A | 5/1986 | Kaiser et al. ............. | 350/96.18 |
| 4,702,549 A | 10/1987 | Duck et al. ............... | 350/96.15 |
| 4,989,938 A | 2/1991 | Tamulevich ............. | 350/96.15 |
| 5,018,833 A * | 5/1991 | Bennett et al. ............. | 359/888 |
| 5,226,104 A | 7/1993 | Unterleitner et al. ........ | 385/140 |
| 5,267,046 A * | 11/1993 | Stephenson, III ........... | 347/232 |
| 5,319,733 A | 6/1994 | Emmons et al. ............. | 385/140 |
| 5,915,063 A | 6/1999 | Colbourne et al. ......... | 385/140 |
| 5,978,135 A | 11/1999 | Abbott et al. ............... | 359/484 |
| 6,097,874 A | 8/2000 | Yunoki ........................ | 385/140 |

* cited by examiner

*Primary Examiner*—Robert H. Kim
*Assistant Examiner*—George Wang
(74) *Attorney, Agent, or Firm*—Lahive & Cockfield, LLP

(57) ABSTRACT

A method and apparatus for variable optical attenuation is disclosed. A variable optical attenuator is provided having a housing. Within the housing, a filter is mounted on a drive shaft of a motor such that the drive shaft passes through a substantially center point of the filter. The filter has a monotonically increasing filter gradient that begins at a lower optical density and gradually increases in optical density in a diametrical pattern. An input optical fiber provides a light signal to be attenuated. The input optical fiber introduces the light signal, which passes through a first collimator, through the filter, through a second collimator, and to an output optical fiber which exits the housing. When activated, the motor rotates the drive shaft to position the filter to a desired attenuation position for attenuating the light signal.

24 Claims, 4 Drawing Sheets

VARIABLE OPTICAL ATTENUATOR

FIELD OF THE INVENTION

The invention relates to optical fiber attenuators, and more particularly to a variable optical attenuator.

BACKGROUND OF THE INVENTION

In optical systems, certain optical signals often need to be attenuated. As such, optical systems often include optical attenuators. A particular type of attenuator is a variable optical attenuator, which can vary the amount of attenuation. Such attenuators have a variety of potential uses in optical systems. For example, variable optical attenuators can be used to compensate for variable input strengths to achieve a constant output strength, or to compensate for variable path length attenuation to produce equal strength signals for signals that travel different paths. Alternatively, variable optical attenuators can be used to compensate for variable input strengths to achieve desired but differing lower signal strengths.

Some objectives in the field of variable optical attenuators are to provide such attenuators in a manner that is both cost effective and highly reliable. One prior solution, for example, is illustrated in FIGS. 1A, 1B and 1C. A variable optical attenuator 10 is provided with a housing 12 that supports a motor 14. A drive shaft 16 extends from the motor 14 passes through, and mounts together with, a device 18 for converting the rotational motion to linear motion, (e.g., rack & pinion, threaded screw & nut, worm gear, cam, and the like). A rectangular shaped filter 22 mounts on one end of the device 18. An input optical fiber 24 enters the housing 12 and terminates with an input collimator 26. Also provided is an output collimator 28, which is in optical communication with output optical fiber 30. The output optical fiber 30 exits the housing 12 at a second end, thus transmitting any light signals out of the attenuator 10. In addition, a potentiometer 32 mounts, for example, at a distal end of the drive shaft 16 extending from the motor 14. The potentiometer 32 indicates a rotational position of the drive shaft 16.

The rectangular filter 22 is illustrated in FIG. 1B. The rectangular filter 22 is a neutral density filter with a linearly increasing gradient. As a light signal travels through input optical fiber 24 and input collimator 26 the light signal passes through rectangular filter 22 before entering output collimator 28 and output optical fiber 30. The motor 14 activates the device 18 for converting rotational motion to linear motion and linearly slides the rectangular filter 22 to a desired attenuation position. This form of optical attenuator 10 has a significant number of moving parts. The device 18, depending on its particular configuration, can experience an amount of backlash or play, which makes specific placement of the rectangular filter 22 and the subsequent attenuation level more difficult to achieve. There is also a concern that the backlash or play can be affected by vibrations from surrounding machinery, which might ultimately cause creep and a subsequent unintentional change in attenuation level.

FIG. 1C illustrates a graphical representation of a level of attenuation versus amount of linear motion on the part of the rectangular filter 22. As can be seen, this relationship is substantially linear.

A second conventional solution to variable optical attenuation, for example, is illustrated in FIGS. 1D, 1E, and 1F. As shown, an optical attenuator 34 has a housing 36 that supports a motor 38. The motor 38 has a drive shaft 40 extending therefrom. A circular filter 42 mounts on the drive shaft 40 of the motor 38 such that the drive shaft 40 passes through a center point of the circular filter 42. An input optical fiber 44 enters the housing 36 at one end and mounts to input collimator 46. In addition, an output collimator 48 is in optical communication with an output optical fiber 50. The output optical fiber 50 extends out a second end of the housing 36. Once again, a potentiometer 52 is provided at a distal end of the drive shaft 40 to indicate the rotational position of the drive shaft 40 and the circular filter 42.

In this version of variable optical attenuator 34, input optical fiber 44 provides a light signal to input collimator 46. The light signal passes through circular filter 42 and enters output collimator 48 to subsequently exit the housing 36 through the output optical fiber 50.

The attenuation level in this version of attenuator 34 adjusts as follows. The motor 38 activates to rotate the drive shaft 40 and subsequently the circular filter 42. As the circular filter 42 rotates, the various levels of attenuation pass in front of the light signal as it exits from input collimator 46 and enters the output collimator 48 and subsequently, the output optical fiber 50.

As illustrated in FIG. 1E, the circular filter 42 is a neutral density filter. The filter 42 has circularly varying attenuation levels along radians of the circle structure. The relationship of attenuation level to rotation of the circular filter 42 is illustrated in FIG. 1F. As can be seen, this relationship is also substantially linear. One concern in this type of optical attenuator 34 is that there exists a significant relative cost of forming the circularly varying attenuation levels of circular filter 42, in a predictable, monotonically increasing, fashion.

SUMMARY OF THE INVENTION

For the foregoing reasons, there exists in the art a need for a variable optical attenuator that is both cost efficient to manufacture and mechanically stable and reliable. The present invention is directed toward further solutions in this art.

In accordance with example embodiments of the present invention, a variable optical attenuator is provided having a housing. A motor mounts within the housing, and a drive shaft extends from the motor. A filter is mounted on the drive shaft of the motor such that the drive shaft passes through a substantially center point of the filter. The filter has a filter gradient that begins at a lower optical density (appears more clear) first edge of the filter and gradually increases in optical density (appears more opaque) toward a second edge of the filter, the second edge being diametrically opposed from the first edge. The filter gradient can be linear, substantially linear, monotonically increasing, and the like. An input optical fiber provides a light signal to be attenuated. The input optical fiber introduces the light signal, which passes through a first collimator, through the filter, through a second collimator, and to an output optical fiber which exits the housing. When activated, the motor rotates the drive shaft to position the filter to a desired attenuation position for attenuating the light signal.

In one aspect of the present invention, the filter element is a neutral density filter, and is substantially circular in shape. In still another aspect of the present invention, the filter element has a linear filter gradient, which gradually increases in optical density from a first edge of the filter to a second, diametrically opposed, edge of the filter.

In still another aspect of the present invention, the housing is sealed to prevent unwanted and undesired light from entering the housing.

In yet another aspect of the present invention, a potentiometer is provided within the housing. The potentiometer is in communication with the drive shaft to aid in determining the rotational position of the drive shaft.

In still another aspect of the present invention, a surface of the filter has placed thereupon, an entirely reflective coating to prevent stray light from interfering with the light signal. In yet another aspect of the present invention, the input optical fiber and collimator, and the output optical and collimator, are angled with respect to each other such that a reflection from the filter element of the light signal is not received in either of the input or output optical fibers or collimators.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1A:
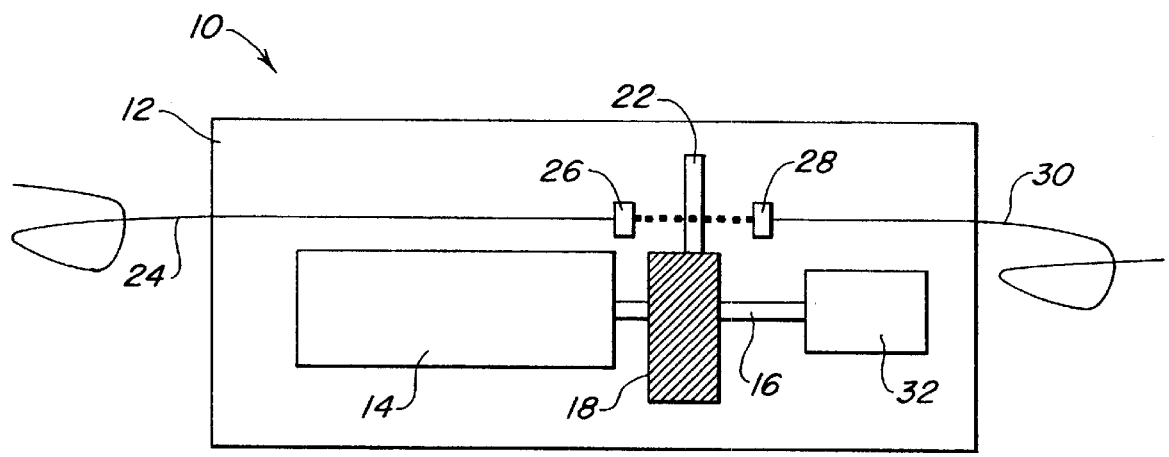
FIGS. 1A, 1B, and 1C are various illustrations relating to a rectangular filter arrangement according to known prior art.
Figure 1B:
Figure 1C:
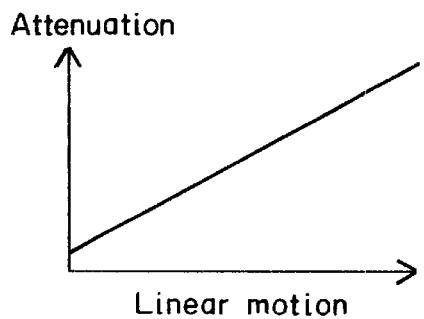
Figure 1D:
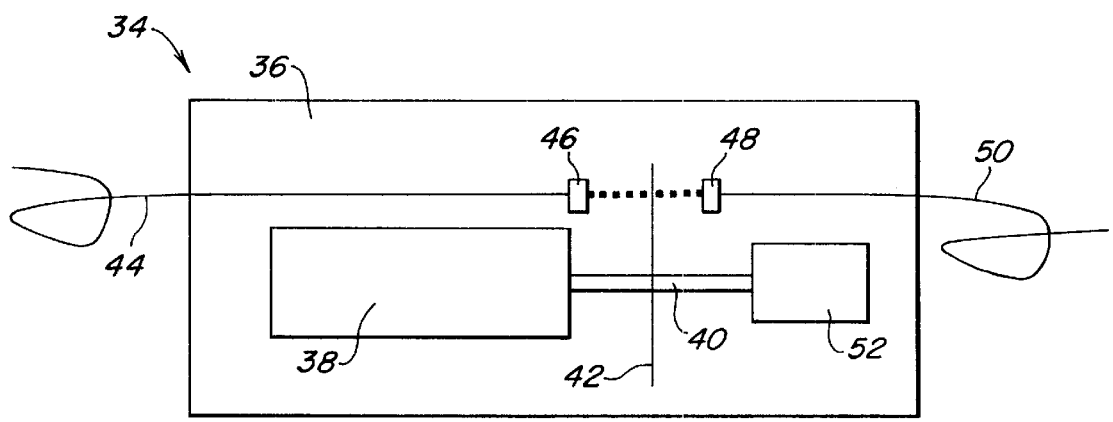
FIGS. 1D, 1E, and 1F are various illustrations relating to a circular filter arrangement according to known prior art.
Figure 1E:
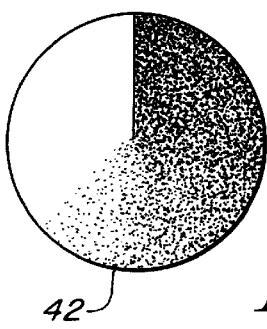
Figure 1F:
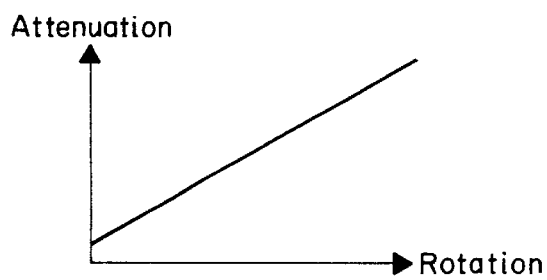

The present invention generally relates to an apparatus and method for the variable optical attenuation of a light signal. A structurally reliable mechanical arrangement is provided in an illustrative embodiment, wherein a circular filter is mounted on a drive shaft of an electric motor, although any number of drive mechanisms can be utilized as would be known to one of ordinary skill in the art. The circular filter has thereupon a filter gradient, which gradually increases in optical density from a first edge to a second diametrically opposed edge of the circle. As a light signal passes through the circular filter, the motor is activated to rotate the circular filter to a desired attenuation level. An attenuation response curve is substantially sinusoidal in nature.

Referring now in detail to the drawings wherein like parts are designated by like reference numerals throughout, FIGS. 2–5 illustrate example embodiments of a variable optical attenuator 54 according to the present invention. Although the present invention will be described with reference to the example embodiments illustrated in the figures, it should be understood that the present invention can be embodied in many alternative forms. In addition, any suitable size, shape, or type of elements or materials can be utilized.

Figure 2:
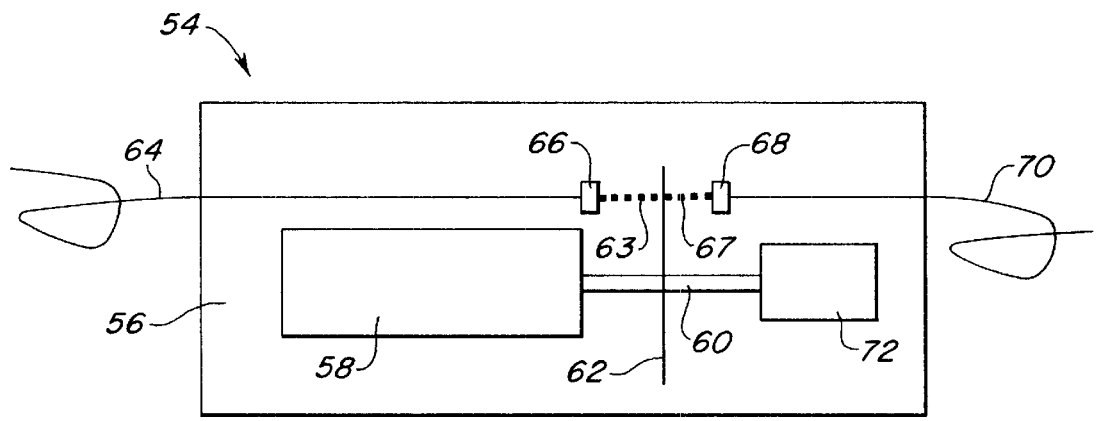
FIG. 2 is a schematic illustration of a variable optical attenuator according to one embodiment of the present invention.

As illustrated in FIG. 2, a variable optical attenuator 54 is provided. A housing 56 supports a motor 58. The housing may be of any number of different materials, including, e.g., aluminum or other metal, thermoplastic or other plastic, or composite materials. The housing 56 can also be hermetically sealed to significantly hinder the intrusion of unwanted particulate matter, light, humidity, and the like. The motor 58 mounts to an internal segment of the housing 56. According to one aspect of the present invention, the motor 58 is a stepper-type electric motor. Alternative drive mechanisms can substitute for the motor 58, such as a solenoid and gear combination, additional gear and pulley arrangements, bi-metal strip actuators, or other motor types and combinations, in addition to other drive mechanisms not specifically mentioned herein but known to one of ordinary skill in the art.

In the example illustrated, a drive shaft 60 extends from the motor 58. Mounted on the drive shaft 60, is a circular filter 62. The drive shaft 60 actually passes through a substantially center point of the circular filter 62. The circular filter 62 may be mounted by any number of methods, including frictional resistance, adhesive, or fastener. In addition, the filter 62 can mount to other elements in communication with the drive shaft 60, such as for example, additional gear works, or chain and gear arrangements. The present invention is not limited to mounting the filter 62 directly on the drive shaft 60. Instead, the intention of this example is to illustrate a drive mechanism in ultimate communication with the filter 62, to position the filter 62 as desired.

The gradient on the circular filter 62 can increase in a linear, substantially linear, monotonically increasing, stepwise, or other similar fashion.

Further, the teachings of the present invention are not limited to a circular shaped filter. In the particular embodiment illustrated and disclosed herein, a circle shape proves to be the most efficient shape for the arrangement. However, the actual shape of the filter can differ. One guiding characteristic of the filter is that depending on the mechanism by which the filter affects the optical signal, the filter must rotate or move in a manner that allows the different filter gradients to attenuate the signal as desired, without allowing the signal to pass around an edge of the filter, if such a result is undesirable. Thus, the filter can be, e.g., a circle, oval, square, polygon, pentagon, octagon, random shape with cut-outs, etc., so long as the optical signal passes through different gradient sections of the filter as desired. In an even further alternative, the filter can contain an aperture, or a modified edge such that if no attenuation is desired, the optical signal does not pass through the filter at all, but around it or through the aperture, which represents a desired mode of zero attenuation level.

Also mounted within the housing 56 is an input collimator 66. An input optical fiber 64 enters one end of housing 56 and is clamped in optical communication to input collimator 66. Output collimator 68 is also mounted within housing 56. Output optical fiber 70 is clamped to output collimator 68, and is in optical communication with output collimator 68. Output optical fiber 70 passes through a second end of housing 56. The input and output optical fibers 64, 70 can be mounted in several ways. For example, a fiber positioning sleeve (known in the art) can be provided to mount and maintain each of the input and output optical fibers 64, 70 in proper alignment.

In operation, a light signal 63 passes from input optical fiber 64 through input collimator 66 to a surface of circular filter 62, and continues to output collimator 68 to ultimately exit housing 56 through output optical fiber 70. In passing through circular filter 62, the light signal 63 is modified. The light signal 63 enters the housing 56 at a predetermined level and is modified to an attenuated level as attenuated light signal 67 prior to entering output collimator 68 and exiting the housing 56 through output optical fiber 70. A desired attenuation level is achieved by controlling the motor 58 to rotate drive shaft 60 in a desired direction, which subsequently rotates the circular filter 62 to a target optical density. The greater the optical density is in the particular portion of the circular filter 62, the greater the resulting attenuation level.

The circular filter 62 may be mounted in a substantially orthogonal position relative to an optical axis of each of the input optical fiber 64 and output optical fiber 70 within the optical coupling space between each of the input and output collimators 66, 68. Alternatively, the circular filter 62 may be mounted in a substantially non-orthogonal position relative to the optical axis of each of the input and output optical fibers 64, 70 to minimize any back reflection and subsequent optical interference. When the circular filter 62 is in the substantially orthogonal position, it is preferred to include an anti-reflective coating or a fiber coating on the circular filter 62 surface. This coating serves to minimize back reflection and straying light from causing substantial signal interference within the device, therefore enhancing device performance, and is known by those of ordinary skill in the art.

Figure 3:
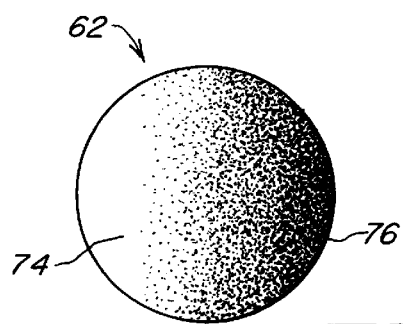
FIG. 3 is a schematic illustration of a circular filter according to one embodiment of the present invention.
Figure 4:
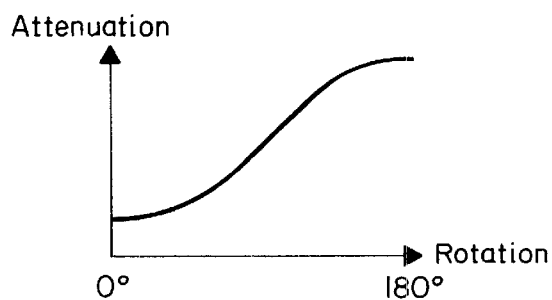
FIG. 4 is a graphical representation of attenuation level verses filter rotation according to one embodiment of the present invention.

As illustrated in FIG. 3, the circular filter 62 is comprised of a filter gradient which gradually increases in optical density from a first edge of the circular filter 62 toward a second diametrically opposed edge of circular filter 62. In other words, the circular filter 62 has an optical density gradient that varies along its diameter. The filter 62, as previously mentioned, contains a gradient that can increase in a linear, substantially linear, monotonically increasing, stepwise, or other similar fashion. The filter illustrated is a neutral density filter, i.e., the filter absorbs light over virtually the entire visible spectrum). However, the present invention is not intended to be limited to neutral density. Rather, any variety of chromatic filtering applications can be suitable for use in the present invention. Further, the filter may be fabricated from any number of materials that allow light to pass through, such as, e.g., glass, plastic, or composite. In addition, the filter may be rigid or, e.g., a flexible polymeric film.

The optical density, as mentioned, increases and decreases along a diameter of the circular filter 62. Thus, to alter the attenuation level, the circular filter 62 is rotated which provides areas or regions of differing optical density disposed in the optical coupling space between the collimators 66, 68. The differing optical densities transmit and absorb different amounts of light, thereby providing a continuously variable filter means. By varying the rotational position of the circular filter 62, the degree of light attenuation across the device can be varied. For example, if a minor attenuation level is desired the circular filter 62 is rotated such that light signal 63 passes through a relatively lesser optical density portion 74 of the circular filter 62. Alternatively, as a more substantial attenuation rate is desired, circular filter 62 is rotated such that light signal 63 passes through greater optical density portions 76 of the circular filter 62.

Figure 5:
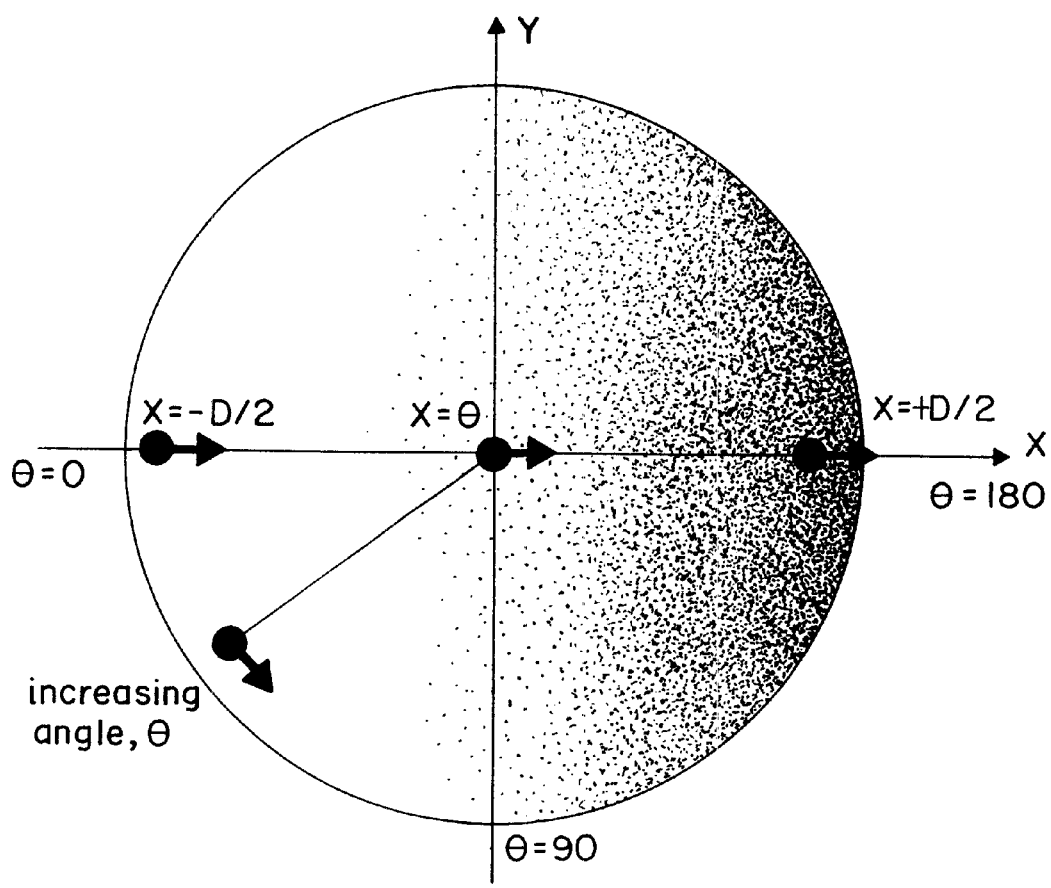
FIG. 5 is a plot of X and Y coordinates over the circular filter according to one aspect of the present invention.

In other known variable optical attenuators as previously discussed herein, the relationship of attenuation level to linear motion or rotational positions of filter elements is substantially linear. With a circular filter 62 according to example embodiments of the present invention, the relationship between attenuation level and rotational position is one of a substantially sinusoidal nature as illustrated in the plot of attenuation level versus rotation in FIG. 4. The attenuation resolution varies across the range of the sinusoidal curve such that the maximum attenuation resolution is simply the slope achieved with a comparable filter and linear position. This makes the adjustment of the attenuation level slightly more complex to execute. However, this is easily accommodated by the use of a computer processor or microprocessor and a simple calculation to establish a correlation between the amount of rotation required for a desired change in attenuation level. The attenuation, for example, of the coating as a function of X and Y in FIG. 5 is Atten=(MaxAtten)*(X/D+½). (diameter=D, distance=X from one rim, where X ranges from zero to D and X=D/2 is the center of the circle). The attenuation of the coating as a function of rotation angle ($\theta$) at a constant radius is Atten= (MaxAtten/2)*(1−Cos $\theta$). In the example circular filter shown in FIG. 5, the attenuation near the edge X=−D/2 is zero (as opposed to being zero at the edge. The attenuation ranges from 0 to MaxAtten, and varies linearly.

In the previously discussed prior solutions having substantially linear relationships between the attenuation level and the required linear or rotational motion, similar calculations are known to compensate for minor fluctuations in otherwise monotonically increasing gradients. These calculations can be carried out in myriad number of ways that one of ordinary skill in the art is familiar, and thus not further discussed herein.

The variable optical attenuator 54 of the example embodiments of the present invention combines the stable and reliable mechanical device of a simple electric motor 58 and drive shaft 60 combination with a circular filter 62. A potentiometer 72 can be utilized in measuring the rotational position of the drive shaft 60. The rotational measuring device can be one of any number of devices other than a potentiometer, such as for example, an optically encoded disk or shaft and a counter for counting motor steps.

In addition, the circular filter 62 is less expensive to manufacture because of its filter gradient, which gradually increases in optical density in a linear, substantially linear, monotonically increasing, stepwise, or other similar fashion. Due to inherent restrictions in manufacturing techniques, it is less expensive to apply a monotonically increasing gradient along a surface in one linear direction rather than in a circularly varying manner as in some of the known prior art.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A filter for a variable optical attenuator of light, comprising:
    a filter element that results in an attenuation of the light varying non-linearly with a displacement of the filter element relative to the light, said filter element having a filter gradient gradually increasing in optical density from proximal a first filter edge to proximal a second, diametrically opposed, filter edge.

2. The filter according to claim 1, wherein said filter is a neutral density filter.

3. The filter according to claim 1, wherein said filter element is substantially circular.

4. The filter according to claim 1, wherein said filter gradient originates at a low optical density portion proximal to one of said first and second filter edges.

5. The filter according to claim 1, wherein said filter gradient terminates at a high optical density portion proximal to one of said first and second filter edges.

6. The filter according to claim 1, wherein said filter element is fabricated of glass.

7. The filter according to claim 1, wherein a surface of said filter is coated with an anti-reflective coating.

8. The filter according to claim 1, wherein said filter gradient is comprised of reflective lines extending across said filter element.

9. A variable optical attenuator, comprising:
a housing;
a motor mounted within said housing, said motor having a drive shaft;
a filter mounted on said drive shaft such that said drive shaft passes through a substantially center point of said filter, said filter having a filter gradient that begins at a first filter edge and gradually increases in optical density across said filter toward a second filter edge diametrically opposed from said first filter edge; and
an input optical fiber providing a light signal to be attenuated, said input optical fiber aimed such that said light signal passes through a first collimator, said filter, and a second collimator, to an output optical fiber;
wherein said motor rotates said drive shaft to position said filter to a desired attenuation position for attenuation of said light signal.

10. The variable optical attenuator of claim 9, wherein said filter element is a neutral density filter.

11. The variable optical attenuator of claim 9, wherein said filter element is substantially circular in shape.

12. The variable optical attenuator of claim 9, wherein said housing is sealed.

13. The variable optical attenuator of claim 9, further comprising a device in communication with said drive shaft to aid in determining a rotational position of said drive shaft.

14. The variable optical attenuator of claim 13, wherein said device is one of a potentiometer, an optically encoded element, and a counter.

15. The variable optical attenuator of claim 9, wherein a surface of said filter has thereupon, one of an anti-reflective coating, and a fiber coating.

16. The variable optical attenuator of claim 9, wherein said input optical fiber and collimator and said output optical fiber and collimator are angled with respect to each other such that a reflection from said filter element of said light signal is not received in either of said input and output optical fibers and collimators.

17. The variable optical attenuator of claim 9, wherein said motor is a stepper motor.

18. The variable optical attenuator of claim 9, wherein said housing is fabricated from one of metal, plastic, and composite materials.

19. A method of variably attenuating an optical signal, comprising the steps of:
receiving a light signal from an input fiber and collimator;
directing said light signal through a substantially circular filter element having a filter gradient that begins at a first filter edge and gradually increases in optical density across said filter element toward a second filter edge diametrically opposed from said first filter edge location;
actuating a motor to rotate a drive shaft and said filter element to a desired attenuation level within said filter gradient;
receiving an attenuated light signal in an output fiber and collimator.

20. The method according to claim 19, further comprising the step of measuring a rotational position of said drive shaft with a potentiometer while adjusting said attenuation level.

21. A variable optical attenuator, comprising:
a housing;
a motor mounted within said housing, said motor having a drive shaft;
a filter mounted within said housing, such that said drive shaft drives said filter to control filter position, said filter having a filter gradient that begins at a first filter edge and gradually increases in optical density across said filter toward a second filter edge; and
an input optical fiber providing a light signal to be attenuated, said input optical fiber aimed such that said light signal passes through a first collimator, said filter, and a second collimator, to an output optical fiber;
wherein said motor rotates said drive shaft to position said filter to a desired attenuation position for attenuation of said light signal.

22. The variable optical attenuator of claim 21, wherein said desired attenuation position is one in which said light signal does not penetrate said filter.

23. A filter for a variable optical attenuator, comprising:
a filter element, said filter element having a filter gradient gradually increasing in optical density from proximal a first filter edge to proximal a second, diametrically opposed, filter edge, wherein said filter gradient is comprised of reflective lines extending across said filter element.

24. A variable optical attenuator, comprising:
a sealed housing;
a motor mounted within said housing, said motor having a drive shaft;
a filter mounted on said drive shaft such that said drive shaft passes through a substantially center point of said filter, said filter having a filter gradient that begins at a first filter edge and gradually increases in optical density across said filter toward a second filter edge diametrically opposed from said first filter edge; and
an input optical fiber providing a light signal to be attenuated, said input optical fiber aimed such that said light signal passes through a first collimator, said filter, and a second collimator, to an output optical fiber;
wherein said motor rotates said drive shaft to position said filter to a desired attenuation position for attenuation of said light signal.

* * * * *